(12) United States Patent
Kuratani et al.

(10) Patent No.: US 10,714,723 B2
(45) Date of Patent: Jul. 14, 2020

(54) SEPARATOR FOR A NON-AQUEOUS SECONDARY BATTERY, AND NON-AQUEOUS SECONDARY BATTERY

(71) Applicant: Teijin Limited, Osaka-shi, Osaka (JP)

(72) Inventors: Rika Kuratani, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 137 days.

(21) Appl. No.: 15/321,948

(22) PCT Filed: Jun. 22, 2015

(86) PCT No.: PCT/JP2015/067932
§ 371 (c)(1),
(2) Date: Dec. 23, 2016

(87) PCT Pub. No.: WO2016/002567
PCT Pub. Date: Jan. 7, 2016

(65) Prior Publication Data
US 2018/0212220 A1  Jul. 26, 2018

(30) Foreign Application Priority Data
Jun. 30, 2014  (JP) .................. 2014-135221

(51) Int. Cl.
*H01M 2/16*   (2006.01)
*H01M 2/14*   (2006.01)
*H01M 10/0525*  (2010.01)

(52) U.S. Cl.
CPC ....... *H01M 2/1666* (2013.01); *H01M 2/1653* (2013.01); *H01M 2/145* (2013.01); *H01M 10/0525* (2013.01)

(58) Field of Classification Search
CPC .... H01M 2/1666; H01M 2/16; H01M 2/1653; H01M 10/0525
See application file for complete search history.

(56) References Cited

U.S. PATENT DOCUMENTS

| | | | |
|---|---|---|---|
| 2004/0053122 A1 | 3/2004 | Sugiyama et al. | |
| 2010/0285348 A1 | 11/2010 | Murata et al. | |
| 2014/0248525 A1 | 9/2014 | Iwai et al. | |
| 2015/0179997 A1* | 6/2015 | Iwai ................. | H01M 2/1653 |
| | | | 429/145 |

FOREIGN PATENT DOCUMENTS

| | | |
|---|---|---|
| CN | 103890999 A | 6/2014 |
| JP | 2004-146190 A | 5/2004 |
| JP | 2006-120462 A | 5/2006 |
| JP | 4127989 B2 | 7/2008 |
| JP | 2012-043762 A | 3/2012 |
| JP | 2012-074367 A | 4/2012 |
| JP | 2012-109249 A | 6/2012 |
| JP | 2013-173862 A | 9/2013 |
| JP | 2013-211185 A | 10/2013 |
| JP | 2014-041818 A | 3/2014 |
| WO | 2013/058371 A1 | 4/2013 |
| WO | 2013/133074 A1 | 9/2013 |
| WO | 2014/021290 A1 | 2/2014 |
| WO | 2014/021293 A1 | 2/2014 |

OTHER PUBLICATIONS

International Search Report for PCT/JP2015/067932 dated Aug. 18, 2015 [PCT/ISA/210].
Japanese Office Action for JPA No. 2015-551293 dated Jan. 5, 2016.
Office Action dated Sep. 3, 2018, by State Intellectual Property Office of People's Republic of China for Application No. 201580032723.2, 10 pages total.

* cited by examiner

*Primary Examiner* — Helen Oi K Conley
(74) *Attorney, Agent, or Firm* — Sughrue Mion, PLLC

(57) ABSTRACT

Provided is a separator for a non-aqueous secondary battery, including: a porous substrate having an average pore diameter of from 20 nm to 100 nm; and a porous layer provided on one or both sides of the porous substrate and including a polyvinylidene fluoride resin and a filler, the porous layer including a filler in an amount of from 45% by volume to 75% by volume with respect to a total solid content of the porous layer, a weight average molecular weight of the polyvinylidene fluoride resin being 1,000,000 or more, and a peel strength between the porous substrate and the porous layer being 0.20 N/12 mm or more.

20 Claims, No Drawings

SEPARATOR FOR A NON-AQUEOUS SECONDARY BATTERY, AND NON-AQUEOUS SECONDARY BATTERY

CROSS REFERENCE TO RELATED APPLICATIONS

This application is a National Stage of International Application No. PCT/JP2015/067932 filed Jun. 22, 2015 (claiming priority based on Japanese Patent Application No. 2014-135221 filed Jun. 30, 2014), the contents of which are incorporated herein by reference in their entirety.

TECHNICAL FIELD

The present invention relates to a separator for a non-aqueous secondary battery and a non-aqueous secondary battery.

BACKGROUND ART

Non-aqueous secondary batteries, which are represented by lithium ion secondary batteries, are widely spread as power sources for portable electronic devices such as notebook-size personal computers, mobile phones, digital cameras and camcorders.

In recent years, outer packagings of non-aqueous secondary batteries have been simplified and lightened with size reduction and weight reduction of portable electronic devices. as outer packaging materials, aluminum cans have been developed in place of stainless cans, and further, aluminum laminated film packages have been developed in place of metallic cans.

However, an aluminum laminated film package is soft, and therefore in a battery having the package as an outer packaging (soft package battery), a gap is easily formed between an electrode and a separator due to external impact, or electrode expansion and shrinkage associated with charge-discharge, as a result of which the cycle life may be reduced.

Techniques for improving adhesion between an electrode and a separator have been proposed in view of solving the above-mentioned problem. As one of the techniques, a separator in which a porous layer containing a polyvinylidene fluoride resin is formed on a polyolefin microporous film is known (see, for example, Patent Literatures 1 to 5). When superimposed on an electrode and heat-pressed, the separator is favorably bound to the electrode with the porous layer interposed therebetween, so that the cycle life of a battery can be improved.

On the other hand, along with densification and capacity enhancement of soft package batteries, separators which improve safety of batteries have been proposed. For example, Patent Literature 6 proposes a separator in which a heat-resistant layer containing inorganic particles and a heat-resistant binder resin is formed on a polyolefin microporous film. Patent Literature 7 proposes a separator in which a porous layer containing a polyvinylidene fluoride resin and inorganic particles is formed on a polyolefin microporous film.

LIST OF PRIOR ART LITERATURE

Patent Literature

Patent Literature 1: Japanese Patent No. 4127989
Patent Literature 2: International Publication No. WO 2014/021293
Patent Literature 3: International Publication No. WO 2013/058371
Patent Literature 4: International Publication No. WO 2014/021290
Patent Literature 5: Japanese Patent Application Laid-Open (JP-A) No. 2014-41818
Patent Literature 6: Japanese Patent Application Laid-Open (JP-A) No. 2006-120462
Patent Literature 7: Japanese Patent Application Laid-Open (JP-A) No. 2012-74367

SUMMARY OF INVENTION

Technical Problem

However, the separators disclosed in Patent Literatures 1 to 5 are inventions directed to improvement in adherence between a separator and an electrode, and are not directed to improvement in safety of batteries. In order to improving safety of batteries, it is required to further improve thermal dimensional stability of separators.

The separators disclosed in Patent Literatures 6 and 7 are separators having, as an outermost layer, a heat-resistant layer including inorganic particles, and are therefore considered as being excellent in thermal dimensional stability, and enabling to improve safety of batteries. However, separators having as an outermost layer a heat-resistant layer containing inorganic particles do not necessarily have sufficient adherence to an electrode.

Embodiments of the invention has been made on view of the situations described above.

An object of an embodiment of the invention is to provide: a separator for a non-aqueous secondary battery excellent in adherence to an electrode and thermal dimensional safety; and a non-aqueous secondary battery excellent in cycle characteristics and thermal safety.

Solution to Problem

Specific means for solving the problem are as follows:
<1> A separator for a non-aqueous secondary battery, comprising:
a porous substrate having an average pore diameter of from 20 nm to 100 nm; and
a porous layer provided on one or both sides of the porous substrate and comprising a polyvinylidene fluoride resin and a filler,
the porous layer comprising a filler in an amount of from 45% by volume to 75% by volume with respect to a total solid content of the porous layer,
a weight average molecular weight of the polyvinylidene fluoride resin in the porous layer being 1,000,000 or more, and
a peel strength between the porous substrate and the porous layer being 0.20 N/12 mm or more.
<2> The separator for a non-aqueous secondary battery according to <1>, wherein the weight average molecular weight of the polyvinylidene fluoride resin in the porous layer is 1,100,000 or more.

<3> The separator for a non-aqueous secondary battery according to <1> or <2>, wherein a volume average particle diameter of the filler is from 0.1 μm to 2.0 μm.
<4> The separator for a non-aqueous secondary battery according to any one of <1> to <3>, wherein the filler is an inorganic filler.
<5> The separator for a non-aqueous secondary battery according to any one of <1> to <4>, wherein the polyvinylidene fluoride resin comprises a vinylidene fluoride-hexafluoropropylene copolymer.
<6> The separator for a non-aqueous secondary battery according to <5>, wherein, in the vinylidene fluoride-hexafluoropropylene copolymer, a proportion of constituent units derived from hexafluoropropylene is from 2.0% by mass to 7.0% by mass.
<7> The separator for a non-aqueous secondary battery according to any one of <1> to <6>, wherein the porous substrate is a polyolefin microporous film.
<8> The separator for a non-aqueous secondary battery according to any one of <1> to <7>, wherein the porous layer is provided on both sides of the porous substrate.
<9> A non-aqueous secondary battery comprising:
   a positive electrode;
   a negative electrode; and
   the separator for a non-aqueous secondary battery according to any one of <1> to <8>, which is disposed between the positive electrode and the negative electrode,
   the non-aqueous secondary battery producing an electromotive force by lithium doping/de-doping.

Effect of Invention

According to the invention, a separator for a non-aqueous secondary battery that is excellent in adherence to an electrode and thermal dimensional safety and a non-aqueous secondary battery that is excellent in cycle characteristics and thermal safety are provided.

DESCRIPTION OF EMBODIMENTS

Hereinafter, an embodiment of the invention will be described. The descriptions and examples are intended to illustrate the invention, and are not intended to limit the scope of the invention.

The value range shown using the expression "from . . . to . . . " in this specification is a range including values described before and after the term "to" as a minimum value and a maximum value, respectively.

In this specification, the "longitudinal direction" means a long direction of a long separator, and the "transverse direction" means a direction orthogonal to the longitudinal direction of the separator. The "longitudinal direction" is also referred to as a "MD direction", and the "transverse direction" is also referred to as a "TD direction".

<Separator for Non-Aqueous Secondary Battery>

A separator for a non-aqueous secondary battery (also referred to simply as a "separator") of the present disclosure includes a porous substrate having an average pore diameter of from 20 nm to 100 nm, and a porous layer provided on one or both sides of the porous substrate. The porous layer contains a polyvinylidene fluoride resin and a filler.

In the present disclosure, the average pore diameter of the porous substrate is from 20 nm to 100 nm.

When the average pore diameter of the porous substrate is 20 nm or more, ions easily move, so that favorable battery performance can be easily obtained. Further, when the average pore diameter of the porous substrate is 20 nm or more, it becomes that a polyvinylidene fluoride resin easily contacts a surface of the porous substrate, and therefore the peel strength between the porous substrate and the porous layer can be improved. As a result, fuzzing, fine splits, bending, level differences and the like become less likely to occur at a slit end surface at slitting of a separator. From the above-mentioned points of view, the average pore diameter of the porous substrate in the present disclosure is 20 nm or more, more preferably 30 nm or more, and still more preferably 40 nm or more.

When the average pore diameter of the porous substrate is 100 nm or less, bonding points at which a polyvinylidene fluoride resin is bound to a surface of the porous substrate are scattered with high uniformity, so that the peel strength between the porous substrate and the porous layer may improve. As a result, fuzzing, fine splits, bending, level differences and the like become less likely to occur at a slit end surface at slitting of a separator. When the average pore diameter of the porous substrate is 100 nm or less, the separator has excellent thermal dimensional stability, and can exhibit a favorable shutdown function. From the above-mentioned points of view, the average pore diameter of the porous substrate in the present disclosure is 100 nm or less, more preferably 90 nm or less, and still more preferably 80 nm or less.

In a case in which the average pore diameter of the porous substrate is less than 20 nm, or the average pore diameter of the porous substrate is more than 100 nm, it is difficult to have the peel strength between the porous substrate and the porous layer be 0.20 N/12 mm or more.

The porous layer in the present disclosure contains a polyvinylidene fluoride resin and a filler. The content of the filler in the porous layer is from 45% by volume to 75% by volume with respect to a total solid content of the layer.

When the content of the filler in the porous layer is less than 45% by volume with respect to the total solid content, it is difficult to secure thermal dimensional stability of the separator. From this point of view, the content of the filler is 45% by volume or more, more preferably 47.5% by volume or more, and still more preferably 50% by volume or more with respect to the total solid content.

When the content of the filler in the porous layer is more than 75% by volume with respect to the total solid content, it is difficult to secure adherence of the layer to an electrode. From this point of view, the content of the filler is 75% by volume or less, more preferably 72.5% by volume or less, and still more preferably 70% by volume or less with respect to the total solid content.

In the present disclosure, the polyvinylidene fluoride resin contained in the porous layer has a weight average molecular weight of 1,000,000 or more. When the weight average molecular weight of the polyvinylidene fluoride resin contained in the porous layer is less than 1,000,000, it is difficult to secure adherence between an electrode and the porous layer, which contains a relatively large amount of filler (specifically, from 45% by volume to 75% by volume in the total solid content).

When the weight average molecular weight of the polyvinylidene fluoride resin contained in the porous layer is 1,000,000 or more, the separator has excellent thermal dimensional stability.

Further, when the weight average molecular weight of the polyvinylidene fluoride resin contained in the porous layer is 1,000,000 or more, binding property between the resin and the filler is favorable, and favorable adherence between the porous substrate and the porous layer, which contains a relatively large amount of filler, is favorable, and as a result of which fuzzing, fine splits, bending, level differences and the like become less likely to occur at a slit end surface at slitting of the separator.

From the above-mentioned points of view, the weight average molecular weight of the polyvinylidene fluoride resin contained in the porous layer is 1,000,000 or more, more preferably 1,100,000 or more, still more preferably 1,300,000 or more, and further preferably 1,500,000 or more.

In the present disclosure, an upper limit of the weight average molecular weight of the polyvinylidene fluoride resin contained in the porous layer is preferably 2,000,000 or less. When the weight average molecular weight of the polyvinylidene fluoride resin is 2,000,000 or less, a viscosity of a composition for forming a porous layer does not become excessively high, formability of the porous layer and crystal formation in the polyvinylidene fluoride resin are favorable, and the porous layer is adequately porous. From the above-mentioned points of view, the upper limit of the weight average molecular weight of the polyvinylidene fluoride resin contained in the porous layer is more preferably 1,900,000 or less, and still more preferably 1,800,000 or less.

A peel strength between the porous substrate and the porous layer in the separator of the present disclosure is 0.20 N/12 mm or more. When the peel strength is less than 0.20 N/12 mm, peeling may occur between the porous layer and the porous substrate even through the porous layer and the electrode are bound to each other, and as a result, it may be unable to accomplish bonding of the electrode and the separator. The peel strength being 0.20 N/12 mm or more means favorable adherence between the porous layer and the porous substrate, where fuzzing, fine splits, bending, level differences and the like become less likely to occur at a slit end surface at slitting of the separator. From the above-mentioned points of view, the peel strength is 0.20 N/12 mm or more, and more preferably 0.25 N/12 mm or more. The peel strength is preferably as high as possible, and the upper limit thereof is not limited, while the peel strength is 30 N/12 mm or less in general.

In the present disclosure, the peel strength (N/12 mm) between the porous substrate and the porous layer is measured under the condition of a tension speed of 20 mm/min and a tension angle of 180° in an atmosphere at a temperature of 23±1° C. and a relative humidity of 50±5% using a tension tester. Details of the measurement method are as described in Examples.

In the present disclosure, the peel strength between the porous substrate and the porous layer may be controlled by, for example in a case in which the porous layer is formed by a wet coating method, a pore diameter of the porous substrate, a solvent composition of a coating liquid, a solid concentration of a coating liquid, and a formulation of a coagulation liquid for coagulating the porous layer.

The separator of the present disclosure is excellent in both adherence to an electrode and thermal dimensional stability because the average pore diameter of the porous substrate, the weight average molecular weight of the polyvinylidene fluoride resin contained in the porous layer, and the content of the filler in the porous layer each fall within a specific range.

Adherence of the separator to an electrode can be evaluated based on, for example, the peel strength between the electrode and the separator. In the separator of the present disclosure, the peel strength between the electrode and the separator is high because (a) the peel strength between the porous substrate and the porous layer is 0.20 N/12 mm or more, and (b) the porous layer itself has excellent adherence to the electrode.

The peel strength between the porous substrate and the porous layer and the peel strength between the electrode and the separator are different properties, and are not always related to each other. Even when the peel strength between the porous substrate and the porous layer is sufficiently high, the peel strength between the electrode and the separator may be low. Since the average pore diameter of the porous substrate, the weight average molecular weight of the polyvinylidene fluoride resin contained in the porous layer, and the content of the filler in the porous layer each fall within a specific range, the separator of the present disclosure satisfies the above-mentioned requirements (a) and (b) with good balance and further exhibits excellent thermal dimensional stability.

Hereinafter, details of the porous substrate and the porous layer of the separator of the present disclosure will be described.

[Porous Substrate]

In the present disclosure, the porous substrate means a substrate having voids or gaps therein. Examples of the substrate include microporous films; porous sheets composed of fibrous materials such as nonwoven fabrics and papers; and composite porous sheets having, on a microporous film or a porous sheet, one or more other porous layers disposed thereon. The microporous film means a film which has a large number of micropores therein, with the micropores being linked together to allow a gas or liquid to pass from one side to the other side.

The porous substrate includes an organic material and/or inorganic material having electric insulation property.

The porous substrate preferably includes a thermoplastic resin from the viewpoint of imparting a shutdown function to the porous substrate. The shutdown function is such a function that in a case in which the battery temperature increases, the material is melt to close the pores of the porous substrate, so that movement of ions is blocked to prevent thermal runaway of the battery. The thermoplastic resin is preferably a thermoplastic resin having a melting temperature of lower than 200° C., and is particularly preferably a polyolefin.

The porous substrate is preferably a microporous film including a polyolefin (also referred to as a "polyolefin microporous film"). It is preferable that as a polyolefin microporous film, one having sufficient dynamic characteristics and ion permeability is selected from polyolefin microporous films that are applied in conventional separators for a non-aqueous secondary battery.

The polyolefin microporous film preferably includes polyethylene from the viewpoint of exhibiting a shutdown function. A content of polyethylene therein is preferably 95% by mass or more.

The polyolefin microporous film is preferably a polyolefin microporous film containing polyethylene and polypropylene from the viewpoint of imparting such heat resistance that the film is not easily broken when exposed to a high temperature. Examples of the polyolefin microporous film include microporous films in which polyethylene and polypropylene coexist in one layer. Preferably, the microporous film contains polyethylene in an amount of 95% by mass or more and polypropylene in an amount of 5% by mass or less from the viewpoint of attaining both a shutdown function and heat resistance. From the viewpoint of attaining both a shutdown function and heat resistance, it is also preferable that the polyolefin microporous film has a layered structure including two or more layers in which at least one layer contains polyethylene, and at least one layer contains polypropylene.

The polyolefin contained in the polyolefin microporous film is preferably a polyolefin having a weight average molecular weight of from 100,000 to 5,000,000. When the weight average molecular weight is 100,000 or more, sufficient dynamic characteristics may be secured. When the weight average molecular weight is 5,000,000 or less, shutdown characteristics becomes favorable, and formation of the film becomes easy.

The polyolefin microporous film can be produced by, for example, the following method. That is a method including extruding a melt polyolefin resin from a T-die to make the resultant into a sheet, subjecting the sheet to a crystallization treatment, stretching, and treating with heat to obtain a microporous film. An alternative method includes extruding a polyolefin resin melted together with a plasticizer such as a liquid paraffin from a T-die, cooling the resultant to make it into a sheet, stretching, extracting the plasticizer therefrom, and treating the sheet with heat to obtain a microporous film.

Examples of the porous sheet composed of a fibrous material include nonwoven fabrics and papers composed of fibrous materials formed of: polyesters such as polyethylene terephthalate; polyolefins such as polyethylene and polypropylene; and heat-resistant resins such as aromatic polyamide, polyimide, polyether sulfone, polysulfone, polyether ketone and polyether imide. Here, the heat-resistant resin is a polymer having a melting temperature of 200° C. or higher, or a polymer which has no melting temperature but has a decomposition temperature of 200° C. or higher.

Examples of the composite porous sheet include a sheet having a functional layer disposed on a microporous film or a porous sheet. The composite porous sheet is preferable in view of enabling provision of an additional function by way of the functional layer. The functional layer is preferably a porous layer containing a heat-resistant resin or a porous layer containing a heat-resistant resin and an inorganic filler from the viewpoint of imparting heat resistance. Examples of the heat-resistant resin include one or more heat-resistant resins selected from an aromatic polyamide, a polyimide, a polyether sulfone, a polysulfone, a polyether ketone or a polyether imide. Examples of the inorganic filler include a metal oxide such as alumina, and a metal hydroxide such as magnesium hydroxide. Examples of the method of providing a functional layer on a microporous film or a porous sheet include: a method in which a microporous film or a porous sheet is coated with a functional layer; a method in which a microporous film or a porous sheet and a functional layer are bound to each other with an adhesive; and a method in which a microporous film or a porous sheet and a functional layer are bonded to each other by heat-pressing.

In the separator of the present disclosure, an average pore diameter of the porous substrate is from 20 nm to 100 nm. The average pore diameter of the porous substrate is a value measured using a Perm Porometer. Details of a measurement method are as described in Examples.

A thickness of the porous substrate is preferably from 5 µm to 25 µm from the viewpoint of obtaining favorable dynamic characteristics and internal resistance.

A Gurley value (JIS P8117 (2009)) of the porous substrate is preferably from 50 seconds/100 cc to 800 seconds/100 cc from the view point of preventing a short-circuit of a battery and obtaining ion permeability.

A porosity of the porous substrate is preferably from 20% to 60% from the viewpoint of obtaining suitable film resistance and a suitable shutdown function. A method of measuring the porosity of the porous substrate is as described in Examples.

A piercing strength of the porous substrate is preferably 300 g or more from the viewpoint of improving the production yield.

A surface of the porous substrate may be subjected to a corona treatment, a plasma treatment, a flame treatment, an ultraviolet ray irradiation treatment or the like in order to improve wettability with a coating liquid for forming a porous layer.

[Porous Layer]

In the present disclosure, the porous layer is a layer which has a large number of micropores therein, with the micropores being linked together and allowing a gas or liquid to pass from one side to the other side.

In the present disclosure, the porous layer is a layer which is provided on one or both sides of the porous substrate as an outermost layer of the separator, and may be bonded to an electrode. Preferably, the porous layer exists on not only one side, but on both sides of the porous substrate for the battery to have excellent cycle characteristics. When the porous layer exists on both sides of the porous substrate, both sides of the separator are well bound to both electrodes with the porous layer interposed therebetween.

A coating amount of the porous layer is preferably from 0.5 $g/m^2$ to 2.5 $g/m^2$, and more preferably from 0.75 $g/m^2$ to 2.25 $g/m^2$ on one side of the porous substrate from the viewpoint of ion permeability and adherence to an electrode.

In a case in which the porous layer is provided on both sides of the porous substrate, the coating amount of the porous layer is preferably from 1.0 $g/m^2$ to 5.0 $g/m^2$, and more preferably from 1.5 $g/m^2$ to 4.5 $g/m^2$ as a total amount of the porous layer on both sides.

An average thickness of the porous layer is preferably from 0.5 µm to 4 µm, more preferably from 1 µm to 3 µm, and still more preferably from 1 µm to 2 µm on one side of the porous substrate from the viewpoint of securing a high energy density and adherence to an electrode.

A porosity of the porous layer is preferably from 30% to 80%, and more preferably 30% to 60% from the viewpoint of ion permeability and dynamic strength. A method of measuring the porosity of the porous layer is the same as a method of measuring the porosity of the porous substrate (described later).

An average pore diameter of the porous layer is preferably from 10 nm to 200 nm. When the average pore diameter is 200 nm or less, non-uniformity of pores in the porous layer is suppressed, bonding points at which the porous layer is bound to the porous substrate or an electrode are scattered with high uniformity, and the porous layer has favorable adherence to the porous substrate and the electrode. Further, when the average pore diameter is 200 nm or less, uniformity of movement of ions in the porous layer is high, and the battery has favorable cycle characteristics and load characteristics. When the average pore diameter is 10 nm or more, closure of pores caused by swelling of the resin contained in the porous layer when the porous layer is impregnated with an electrolytic solution is less likely to occur.

[Polyvinylidene Fluoride Resin]

In the present disclosure, the porous layer contains a polyvinylidene fluoride resin. A weight average molecular weight of the polyvinylidene fluoride resin contained in the porous layer is 1,000,000 or more.

Examples of the polyvinylidene fluoride resin contained in the porous layer include a homopolymer of vinylidene fluoride (i.e. polyvinylidene fluoride); a copolymer of vinylidene fluoride and other copolymerizable monomer (polyvinylidene fluoride copolymers); and mixtures thereof.

Examples of the monomer polymerizable with vinylidene fluoride include tetrafluoroethylene, hexafluoropropylene, trifluoroethylene, trichloroethylene and vinyl fluoride, one of which or two or more of which may be employed.

The polyvinylidene fluoride resin may be obtained by emulsification polymerization or suspension polymerization.

The polyvinylidene fluoride resin contained in the porous layer is preferably a vinylidene fluoride-hexafluoropropylene copolymer from the viewpoint of adherence to an electrode. When the polyvinylidene fluoride resin is prepared by copolymerizing hexafluoropropylene with vinylidene fluoride, crystallinity and heat resistance of the polyvinylidene fluoride resin can be regulated to fall within a proper range, as a result of which it becomes possible to inhibit flowing of the porous layer during a process of bonding of the porous layer to the electrode.

In the present disclosure, a proportion of constituent units derived from hexafluoropropylene in the vinylidene fluoride-hexafluoropropylene copolymer is preferably from 2.0% by mass to 7.0% by mass. When the content of hexafluoropropylene is 2.0% by mass or more, advancement of crystallization of the polyvinylidene fluoride resin is suppressed, and when the content of hexafluoropropylene is 7.0% by mass or less, the polyvinylidene fluoride resin is properly crystallized. Further, when the content of hexafluoropropylene is 7.0% by mass or less, it is easy to secure heat resistance of the polyvinylidene fluoride resin.

From the above-mentioned points of view, the proportion of constituent units derived from hexafluoropropylene in the vinylidene fluoride-hexafluoropropylene copolymer is more preferably 2.25% by mass or more, still more preferably 2.5% by mass or more, further preferably 6.75% by mass or less, and still further preferably 6.5% by mass or less.

A degree of swelling of the resin contained in the porous layer at the time when the porous layer is impregnated with an electrolytic solution varies depending on the type of the resin and the formulation of the electrolytic solution. A polyvinylidene fluoride resin hard to swell is preferably selected in order to suppress defects associated with swelling of the resin. For example, a polyvinylidene fluoride resin containing a large amount of copolymerization component easily swells, whereas a polyvinylidene fluoride resin containing vinylidene fluoride in an amount of 98 mol % or more is hard to swell, and is thus preferable.

While a polyvinylidene fluoride resin easily swells with an electrolytic solution having a high content of cyclic carbonate such as, for example, ethylene carbonate or propylene carbonate, and a high dielectric constant, a polyvinylidene fluoride resin containing vinylidene fluoride in an amount of 98 mol % or more is relatively hard to swell, and is therefore preferable.

A polyvinylidene fluoride resin containing vinylidene fluoride in an amount of 98 mol % or more can retain sufficient dynamic characteristics and heat resistance even under severe heat-pressing conditions, and is therefore preferable.

[Filler]

The porous layer in the present disclosure contains at least one selected from an organic filler or an inorganic filler. The filler may be used singly, or in combination of two or more kinds thereof. The filler is preferably one that is stable to an electrolytic solution and that is electrochemically stable. The filler is preferably a filler having a heat-resistant temperature of 150° C. or higher, and more preferably a filler having a heat-resistant temperature of 200° C. or higher. The heat-resistant temperature of a filler means a temperature at which deformation (e.g. shrinkage) or degeneration of properties occurs in heating of an object to be heated.

Examples of the organic filler include particles of crosslinked polymers such as crosslinked poly(meth)acrylic acid, crosslinked poly(meth)acrylic acid ester, crosslinked polysilicone, crosslinked polystyrene, crosslinked polydivinylbenzene, crosslinked products of styrene-divinylbenzene copolymer, polyimide, melamine resin, phenol resin and benzoguanamine-formaldehyde condensates; and particles of heat-resistant resins such as polysulfone, polyacrylonitrile, aramid, polyacetal and thermoplastic polyimide. Among them, crosslinked poly(meth)acrylic acid, crosslinked poly(meth)acrylic acid esters, crosslinked polysilicone, polyimide and melamine resin are preferable. Here, the heat-resistant resin is a polymer having a melting temperature of 200° C. or higher, or a polymer having no melting temperature and having a decomposition temperature of 200° C. or higher.

Examples of the inorganic filler include: metal hydroxides such as aluminum hydroxide, magnesium hydroxide, calcium hydroxide, chromium hydroxide, zirconium hydroxide, cerium hydroxide, nickel hydroxide and boron hydroxide; metal oxides such as silica, alumina, zirconia and magnesium oxide; carbonates such as calcium carbonate and magnesium carbonate; sulfates such as barium sulfate and calcium sulfate; and clay minerals such as calcium silicate and talc. Among them, metal hydroxides and metal oxides are preferable, and from the viewpoint of an electricity eliminating effect and impartment of flame retardancy, hydroxides or oxides of magnesium are preferable, and particularly magnesium hydroxide is preferable. The inorganic filler may be one that is surface-modified with a silane coupling agent.

A volume average particle diameter of the filler is preferably from 0.1 µm to 2.0 µm from the viewpoint of adherence of the porous layer to an electrode, ion permeability of the porous layer, slippage of the porous layer, and formability of the porous layer. The lower limit of the volume average particle diameter of the filler is more preferably 0.2 µm or more, still more preferably 0.3 µm or more. The upper limit of the volume average particle diameter of the filler is more preferably 1.5 µm or less, still more preferably 1.0 µm or less.

A particle shape of the filler is not limited, and may be any of a spherical shape, an oval shape, a plate shape, a rod shape and an undefined shape. The filler is preferably in the form of plate-shaped particles, or in the form of non-aggregated primary particles from the viewpoint of inhibiting a short-circuit of the battery.

When the porous layer contains the filler, a surface of the porous layer can be roughened to improve slippage of a surface of the separator. When the filler is in the form of plate-shaped particles or in the form of non-aggregated primary particles because uniformity of the surface roughness of the porous layer is high, so that adherence of the porous layer to an electrode is less likely to be impaired, that is preferable.

A volume ratio of the filler with respect to a total of a volume of the polyvinylidene fluoride resin and a volume of the filler is preferably 45% by volume or more, more preferably 47.5% by volume or more, and still more preferably 50% by volume or more from the viewpoint of thermal dimensional stability of the separator, and preferably 75% by volume or less, more preferably 72.5% by volume or less, and still more preferably 70% by volume or less from the viewpoint of adherence of the porous layer to an electrode.

A content of the filler in the porous layer is preferably from 2.0 g/m² to 3.5 g/m². When the content of the filler is 2.0 g/m² or more, the separator has further excellent heat resistance and ion permeability. When the content of the filler is 3.5 g/m² or less, the porous layer is less likely to separate from the porous substrate.

[Properties of Separator]

A thickness of the separator of the present disclosure is preferably from 5 μm to 35 μm from the viewpoint of mechanical strength and the energy density when the separator is applied to a battery.

A porosity of the separator of the present disclosure is preferably from 30% to 60% from the viewpoint of mechanical strength, handling characteristics and ion permeability. A method of measuring the porosity of the separator is as described in Examples.

A Gurley value (JIS P8117 (2009)) of the separator of the present disclosure is preferably from 50 seconds/100 cc to 800 seconds/100 cc because the balance between mechanical strength and film resistance is improved thereby.

In the separator of the present disclosure, the value obtained by subtracting the Gurley value of the porous substrate from the Gurley value of the separator with the porous layer provided on the porous substrate is preferably 300 seconds/100 cc or less, more preferably 150 seconds/100 cc or less, and still more preferably 100 seconds/100 cc or less from the viewpoint of ion permeability.

A film resistance of the separator of the present disclosure is preferably from 1 ohm·cm² to 10 ohm·cm² from the viewpoint of load characteristics of a battery. Here, the film resistance is a resistance value measured at 20° C. by an alternating current method with a separator impregnated with an electrolytic solution (1 M $LiBF_4$-propylene carbonate:ethylene carbonate [mass ratio 1:1]).

A tortuosity ratio of the separator of the present disclosure is preferably from 1.5 to 2.5 from the viewpoint of ion permeability.

[Method of Producing Separator]

The separator of the present disclosure can be produced by, for example, a wet coating method including the following steps (i) to (iii):

(i) coating a porous substrate with a coating liquid containing a polyvinylidene fluoride resin and a filler, thereby forming a coating layer;

(ii) immersing the porous substrate, which is provided with the coating layer, in a coagulation liquid, and solidifying the polyvinylidene fluoride resin while inducing phase separation in the coating layer, thereby forming a porous layer on the porous substrate to obtain a composite film; and (iii) subjecting the composite film to rinsing with water and drying.

The coating liquid is prepared by dissolving a polyvinylidene fluoride resin in a solvent, and dispersing a filler in the resulting solution.

The solvent to be used in preparation of the coating liquid is a solvent capable of dissolving a polyvinylidene fluoride resin (hereinafter also referred to as a "good solvent"). Examples of the good solvent include polar amide solvents such as N-methylpyrrolidone, dimethylacetamide, dimethylformamide and dimethylformamide.

Preferably, the solvent to be used for preparation of the coating liquid contains a phase separation agent that induces phase separation from the viewpoint of forming a porous layer having a favorable porous structure. Thus, the solvent to be used for preparation of the coating liquid is preferably a mixed solvent of a good solvent and a phase separation agent. Preferably, the phase separation agent is mixed with a good solvent in an amount in a range which ensures that a viscosity suitable for coating can be secured. Examples of the phase separation agent include water, methanol, ethanol, propyl alcohol, butyl alcohol, butanediol, ethylene glycol, propylene glycol and tripropylene glycol.

The solvent to be used for preparation of the coating liquid is preferably a mixed solvent of a good solvent and a phase separation agent, which contains the good solvent in an amount of 60% by mass or more and the phase separation agent in an amount of 40% by mass or less, from the viewpoint of forming a favorable porous structure.

The solvent to be used for preparation of the coating liquid is preferably a mixed solvent of a good solvent and a phase separation agent, the mixed solvent containing the good solvent in an amount of 80% by mass or more and the phase separation agent in an amount of from 5% by mass to 20% by mass, from the viewpoint of controlling the peel strength between the porous substrate and the porous layer to 0.20 N/12 mm or more.

It is considered that when a content ratio of the phase separation agent in the mixed solvent is 5% by mass or more, a pore diameter of the pore structure of the porous layer becomes appropriately small, whereby a large number of fine irregularities are formed on a surface of the porous layer on the porous substrate side, and adherence to the porous substrate is improved by the fine irregularities, so that the peel strength between the porous substrate and the porous layer is secured.

It is considered that when the content of the phase separation agent in the mixed solvent is 20% by mass or less, non-uniformity of the porous structure of the porous layer is suppressed, and thus bonding points at which the porous layer is bound to the porous substrate are scattered with high uniformity on the porous substrate side of a surface of the porous layer to improve adherence to the porous substrate, so that the peel strength between the porous substrate and the porous layer is secured.

A concentration of the polyvinylidene fluoride resin in the coating liquid is preferably from 3% by mass to 10% by mass from the viewpoint of forming a favorable porous structure.

A solid concentration in the coating liquid is preferably from 3.5% by mass to 7% by mass from the viewpoint of controlling the peel strength between the porous substrate and the porous layer to 0.20 N/12 mm or more.

Examples of means for coating the porous substrate with a coating liquid include a Meyer bar, a die coater, a reverse roll coater and a gravure coater. In a case in which the porous layer is formed on both sides of the porous substrate, it is preferable to simultaneously coat the both sides with the coating liquid from the viewpoint of productivity.

The coagulation liquid generally contains water, and the good solvent and phase separation agent used for preparation of the coating liquid. From the viewpoint of production, it is preferable that a mixing ratio of the good solvent and the phase separation agent thereof is made consistent with a mixing ratio of the good solvent and the phase separation agent of the mixed solvent used for preparation of the coating liquid. A content of water in the coagulation liquid is preferably from 40% by mass to 90% by mass from the viewpoint of formation of a porous structure and productivity.

Preferably, the coagulation liquid contains water in an amount of from 40% by mass to 90% by mass and the mixed solvent in an amount of from 10% by mass to 60% by mass from the viewpoint of controlling the peel strength between the porous substrate and the porous layer to 0.20 N/12 mm or more. Preferably, the mixed solvent contains the good solvent in an amount of 80% by mass or more and the phase separation agent in an amount of 20% by mass or less.

A temperature of the coagulation liquid is, for example, from 20° C. to 50° C.

The separator of the present disclosure can also be produced by a dry coating method. The dry coating method is a method in which a porous substrate is coated with a coating liquid containing a polyvinylidene fluoride resin and a filler to form a coating layer, and the coating layer is then dried to solidify the coating layer, whereby a porous layer is formed on the porous substrate. However, in the dry coating method, the porous layer is more easily densified as compared to the wet coating method, and therefore the wet coating method is preferable because a favorable porous structure can be obtained.

The separator of the present disclosure can also be produced by a method in which a porous layer is prepared as an independent sheet, and the porous layer is superimposed on a porous substrate, and laminated thereto by heat-pressing or with an adhesive. Examples of a method of preparing the porous layer as an independent sheet include a method in which a porous layer is formed on a release sheet using the wet coating method or dry coating method, and the porous layer is separated from the release sheet.

<Non-Aqueous Secondary Battery>

A non-aqueous secondary battery of the present disclosure is a non-aqueous secondary battery which produces an electromotive force by doping/de-doping of lithium, the non-aqueous secondary battery including a positive electrode, a negative electrode, and the separator for a non-aqueous secondary battery of the present disclosure. The doping means absorption, holding, adsorption or insertion, which means a phenomenon in which lithium ions enter an active material of an electrode such as a positive electrode.

The non-aqueous secondary battery of the present disclosure includes a positive electrode, a negative electrode, and a separator disposed between the positive electrode and the negative electrode. The non-aqueous secondary battery of the present disclosure has, for example, a structure in which a battery element with a negative electrode and a positive electrode facing each other with a separator interposed therebetween is enclosed in an outer packaging material together with an electrolytic solution. The non-aqueous secondary battery of the present disclosure is suitable as a non-aqueous electrolyte secondary battery, particularly a lithium ion secondary battery.

The non-aqueous secondary battery of the present disclosure includes the separator of the present disclosure as a separator, and thus is excellent in cycle characteristics and thermal safety.

Hereinafter, examples of aspects of a positive electrode, a negative electrode, an electrolytic solution and an outer packaging material each included in the non-aqueous secondary battery of the present disclosure will be described.

The positive electrode has, for example, a structure in which an active material layer containing a positive electrode active material and a binder resin is formed on a current collector. The active material layer may further contain a conductive assistant. Examples of the positive electrode active material include lithium-containing transition metal oxides, specific examples of which including $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$ and $LiAl_{1/4}Ni_{3/4}O_2$. Examples of the binder resin include polyvinylidene fluoride resins. Examples of the conductive assistant include carbon materials such as acetylene black, ketjen black and graphite powders. Examples of the current collector include aluminum foils, titanium foils and stainless foils having a thickness of, for example, from 5 μm to 20 μm.

In the non-aqueous secondary battery of the present disclosure, disposition of the porous layer of the separator on the positive electrode side is advantageous because the polyvinylidene fluoride resin is excellent in oxidation resistance, and therefore a positive electrode active material capable of operating at a high voltage of 4.2 V or more, such as $LiMn_{1/2}Ni_{1/2}O_2$ or $LiCo_{1/3}Mn_{1/3}Ni_{1/3}O_2$, is easily applied.

The negative electrode has, for example, a structure in which an active material layer containing a negative active material and a binder resin is formed on a current collector. The active material layer may further contain a conductive assistant. Examples of the negative active material include materials capable of electrochemically absorbing lithium, specific examples of which including carbon materials; and alloys of lithium and silicon, tin, aluminum or the like. Examples of the binder resin include polyvinylidene fluoride resins and styrene-butadiene rubbers. Examples of the conductive assistant include carbon materials such as acetylene black, ketjen black and graphite powders. Examples of the current collector include copper foils, nickel foils and stainless foils having a thickness of, for example, from 5 μm to 20 μm. Alternatively, in place of the negative electrode described above, a metal lithium foil may be used as a negative electrode.

The electrolytic solution is, for example, a solution obtained by dissolving a lithium salt in a non-aqueous solvent. Examples of the lithium salt include $LiPF_6$, $LiBF_4$ and $LiClO_4$. Examples of the non-aqueous solvent include cyclic carbonates such as ethylene carbonate, propylene carbonate, fluoroethylene carbonate, difluoroethylene carbonate and vinylene carbonate; chain carbonates such as dimethyl carbonate, diethyl carbonate, ethylmethyl carbonate and fluorine-substituted products thereof; and cyclic esters such as γ-butyrolactone and γ-valerolactone. They may be used singly, or in combination of two or more kinds thereof. The electrolytic solution is preferably one obtained by mixing a cyclic carbonate and a chain carbonate at a mass ratio (cyclic carbonate:chain carbonate) of 20:80 to 40:60, and dissolving a lithium salt therein in an amount of from 0.5 M to 1.5 M.

Examples of the outer packaging material include metal cans and aluminum laminated film packages. Examples of a shape of the battery include a rectangular shape, a circular-cylindrical shape and a coin shape, and the separator of the present disclosure is suitable for any shape.

The separator of the present disclosure is excellent in adherence to an electrode, and therefore in a battery including the separator of the present disclosure, a gap is less likely formed between the electrode and the separator due to external impact, or electrode expansion and shrinkage associated with charge-discharge. Thus, the separator of the present disclosure is suitable for soft package batteries having an aluminum laminated film package as an outer packaging material. With the separator of the present disclosure, a soft package battery having high battery performance is provided.

For example, the non-aqueous secondary battery of the present disclosure can be produced by: impregnating, with an electrolytic solution, a laminated body in which the separator of the present disclosure is disposed between a positive electrode and a negative electrode; putting the laminated body in an outer packaging material (e.g. aluminum laminated film package); and pressing the laminated body from above the outer packaging material. In this production method, the electrode and the separator can be favorably bound to each other.

The separator of the present disclosure can be bonded to an electrode when superimposed on the electrode, and therefore the pressing is not an essential step in production of a battery, while it is preferable to perform the pressing in view of improving adherence between the electrode and the separator. It is preferable to perform the pressing in parallel with heating (heat-pressing) for further improving adherence between the electrode and the separator.

A method of disposing the separator between the positive electrode and the negative electrode in production of a non-aqueous secondary battery may be a method in which at least one positive electrode, at least one separator and at least one negative electrode are layered in this order one on another (so called a stacking method), or a method in which the positive electrode, the separator, the negative electrode and the separator are superimposed one on another in this order, and wound in the length direction.

EXAMPLES

The separator and the non-aqueous secondary battery of the present disclosure will be described further in detail below by way of Examples. The separator and the non-aqueous secondary battery of the present disclosure are not limited to examples below.

<Measurement Methods and Evaluation Methods>

Measurement methods and evaluation methods applied in Examples and Comparative Examples are as follows.

[Thickness]

A thickness (μm) of each of the porous substrate and the separator was determined by measuring the thickness at 20 randomly selected spots within an area of 10 cm×30 cm using a contact-type thickness meter (LITEMATIC manufactured by Mitutoyo Corporation), and averaging the measured values. As a measurement terminal, one having a circular-cylindrical shape with a diameter of 5 mm was used, and an adjustment was made so that a load of 7 g was applied during the measurement.

[Porosity]

A porosity of each of the porous substrate and the separator was determined in accordance with the following calculation method.

Where constituent materials are a, b, c, . . . , n, the masses of the constituent materials are Wa, Wb, Wc, . . . , Wn (g/cm$^2$), the true densities of the constituent materials are da, db, dc, . . . , dN (g/cm$^3$), and the thickness is t (cm), the porosity ε (%) is determined from the following equation.

$$\varepsilon = \{1-(Wa/da+Wb/db+Wc/dc+\ldots+Wn/dn)/t\}\times 100$$

[Average Pore diameter of Porous Substrate]

An average pore diameter of the porous substrate was measured using a perm porometer (CFP-1500-A manufactured by PMI, Inc.) in accordance with ASTM E1294-89. GALWICK (manufactured by PMI, Inc.) was used as an immersion liquid.

[Weight Average Molecular Weight of Polyvinylidene Fluoride Resin]

The weight average molecular weight of the polyvinylidene fluoride resin was measured by gel permeation chromatography (GPC).

Apparatus: gel permeation chromatograph Model: ALLIANCE GPC 2000 (manufactured by Waters Corporation)

Column: two pieces of TSKGEL GMH6-HT and two pieces of TSKGEL GMH6-HTL (manufactured by TOSOH CORPORATION)

Column temperature: 140° C.

Mobile phase: o-dichlorobenzene

Column temperature: 140° C.

Standard substance for molecular weight calibration: monodisperse polystyrene (manufactured by TOSOH CORPORATION)

In a case where two polyvinylidene fluoride resins (resin A and resin B) having different molecular weights were mixed and used, the weight average molecular weight was calculated in the following manner:

weight average molecular weight of polyvinylidene fluoride resin=weight average molecular weight of resin A×{mass of resin A÷(mass of resin A+mass of resin B)}+weight average molecular weight of resin B×{mass of resin B÷(mass of resin A+mass of resin B)}.

[Composition of Polyvinylidene Fluoride Resin]

20 mg of polyvinylidene fluoride resin was dissolved in 0.6 ml of heavy dimethyl sulfoxide at 100° C., a $^{19}$F-NMR spectrum thereof was measured at 100° C., and the composition of the polyvinylidene fluoride resin was determined from the NMR spectrum.

[Volume Average Particle Diameter of Filler]

A filler was dispersed in water containing a nonionic surfactant (TRITON X-100), and a particle diameter distribution was measured using a laser diffraction particle diameter distribution analyzer (MASTERSIZER 2000 manufactured by Sysmex Corporation). The 50% cumulative particle diameter from the small particle side in the volume-based particle diameter distribution (D50) was defined as a volume average particle diameter (μm) of the filler.

[Volume Ratio of Filler]

A volume ratio of the filler in the porous layer was determined from a formulation of a solid of the coating liquid.

[Gurley Value]

A Gurley value (seconds/100 cc) of the separator was measured using a Gurley-type densometer (G-B2C manufactured by TOYO SEIKI SESAKU-SHO) in accordance with JIS P8117 (2009).

[Peel Strength Between Porous Substrate and Porous Layer]

An adhesive tape (product No. 550R-12 manufactured by Scotch Company) having a width of 12 mm and a length of 15 cm was attached to a surface of a porous layer on one side of the separator, and the separator was cut in conformity with the width and the length of the adhesive tape to obtain a measurement sample. In attachment of the adhesive tape to the separator, a length direction was made coincident with an MD direction of the separator. The adhesive tape was used as a support for separating the porous layer on one side.

The measurement sample was left standing in an atmosphere at a temperature of 23±1° C. and a relative humidity of 50±5% for 24 hours, and the following measurement was made in the same atmosphere.

Separation of 10 cm of the adhesive tape was performed together with the porous layer which is immediately below the adhesive tape, so that the separator was separated by about 10 cm into a laminated body (1) of the adhesive tape and the porous layer and a laminated body (2) of the porous substrate and the other porous layer. An end of the laminated body (1) was fixed to an upper chuck of a Tensilon (RTC- 1210A manufactured by ORIENTEC CORPORATION), and an end of the laminated body (2) was fixed to a lower chuck of the Tensilon. The measurement sample was suspended in the gravity direction to ensure that the tension angle (angle of the laminated body (1) to the measurement sample) was 180°. The laminated body (1) was drawn at a tension speed of 20 mm/min, and the load in separation of the laminated body (1) from the porous substrate was measured. The load was taken at intervals of 0.4 mm between the points of 10 mm and 40 mm from the start of the measurement, and an average of the loads was defined as a peel strength.

[Bonding Strength to Electrode]

A positive electrode (coated on one side) and an aluminum foil (thickness: 20 μm) were cut to a width of 1.5 cm and a length of 7 cm, and the separator was cut to a width of 1.8 cm and a length of 7.5 cm. The positive electrode, the separator and the aluminum foil were layered in this order to prepare a laminated body. The laminated body was impregnated with an electrolytic solution (1 M $LiBF_4$-ethylene carbonate:propylene carbonate [mass ratio 1:1]), and put into an aluminum laminated film package. Next, an inside of the package was brought into a vacuum state using a vacuum sealer, and the laminated body was heat-pressed together with the package using a heat-pressing machine, thereby bonding the positive electrode and the separator to each other. As conditions for heat-pressing, a load of 1 MPa, a temperature of 90° C., and a pressing time of 2 minutes were employed. The package was then unsealed, the laminated body was taken out from the package, and the aluminum foil was removed from the laminated body to obtain a measurement sample.

A non-coated side of the positive electrode of the measurement sample was fixed to a metal plate with a double-sided tape, and the metal plate was fixed to a lower chuck of a Tensilon (STB-1225S manufactured by A&D Company, Limited). Here, the metal plate was fixed to the Tensilon in such a manner that the length direction of the measurement sample was coincident with the gravity direction. The separator was separated from the positive electrode by about 2 cm from the lower end, and the end was fixed to an upper chuck to ensure that the tension angle (angle of the separator to the measurement sample) was 180°. The separator was drawn at a tension speed of 20 mm/min, and the load in separation of the separator from the positive electrode was measured. The load was measured at intervals of 0.4 mm between the points of 10 mm and 40 mm from the start of the measurement, an average of the loads was defined as a bonding strength to the electrode, and the bonding strength was defined as an index of adherence to the electrode.

The positive electrode to be used in this test was prepared in the following manner. 91 g of lithium cobalt oxide powder as a positive electrode active material, 3 g of acetylene black as a conductive assistant, and 3 g of polyvinylidene fluoride as a binder resin were dissolved in N-methyl-pyrrolidone (NMP) such a manner that a concentration of the polyvinylidene fluoride would be 5% by mass, and the resultant solution was stirred in a dual arm-type mixer to prepare a positive electrode slurry. The positive electrode slurry was applied to one side of a 20 μm-thick aluminum foil, and dried, and pressing was then performed to obtain a positive electrode having a positive electrode active material layer on one side thereof.

[Thermal Shrinkage Ratio]

The separator was cut to a size of 18 cm (MD direction)×6 cm (TD direction) to obtain a test piece. The test piece was marked at two points (point A and point B) 2 cm and 17 cm away from one end, respectively, on a straight line bisecting the test piece in the TD direction. The test piece was marked at two points (point C and point D) 1 cm and 5 cm away from one end, respectively, on a straight line bisecting the test piece in the MD direction. The test piece was held at a part between point A and an end closest to point A, and suspended in an oven at 135° C. in such a manner that the MD direction was coincident with the gravity direction, and the test piece was heat-treated under no tension for 30 minutes. A length between points A and B and a length between points C and D before and after the heat treatment were measured, and a thermal shrinkage ratio (%) was calculated from the following equation.

thermal shrinkage ratio (%) in MD direction={ (length between points $A$ and $B$ before heat treatment−length between points $A$ and $B$ after heat treatment)÷length between points $A$ and $B$ before heat treatment}×100 thermal shrinkage ratio (%) in TD direction={(length between points $C$ and $D$ before heat treatment−length between points $C$ and $D$ after heat treatment)÷length between points $C$ and $D$ before heat treatment}×100

[Heat Resistance]

A soldering iron at 300° C. was applied to the separator for 1 minute, and a size (mm) of a hole thus formed in the separator was measured. Examples and Comparative Examples were evaluated in terms of indexes which are based on a maximum width of the hole in Example 1 being set to 100. The larger the index, the poorer the heat resistance.

[Slitting Property]

The separator was conveyed at a conveyance speed of 40 m/min, an unwinding tension of 0.3 N/cm, and a winding tension of 0.1 N/cm. A stainless laser blade was applied to the separator at an angle of 60° while the separator was horizontally conveyed, and in this manner, the separator having a length of 1000 m was silted. A number of porous layer-derived cut powders with a size of 0.5 mm or more was counted, and the slitting property was evaluated in accordance with the following evaluation criteria. As porous layer-derived cut powders with a size of 0.5 mm or more, members falling off during slitting and members sticking to end surfaces of the slit separator, each of which was visually observed, was counted.

—Evaluation Criteria—

A: The number of porous layer-derived cut powders with a size of 0.5 mm is 5 or less.

B: The number of porous layer-derived cut powders with a size of 0.5 mm is more than 5 but equal to or less than 10.

C: The number of porous layer-derived cut powders with a size of 0.5 mm is more than 10 but equal to or less than 15.

D: The number of porous layer-derived cut powders with a size of 0.5 mm is more than 15 but equal to or less than 20.

E: The number of porous layer-derived cut powders with a size of 0.5 mm is more than 20.

Example 1

A coating liquid was prepared in the following manner: a polyvinylidene fluoride resin (vinylidene fluoride-hexafluoropropylene copolymer, weight average molecular weight: 1,500,000, content of hexafluoropropylene (HFP): 5.2% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 53% by volume: 47% by volume. Both sides of a polyethylene microporous film (thickness: 12 porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Example 2

A coating liquid was prepared in the following manner: a polyvinylidene fluoride resin (vinylidene fluoride-hexafluoropropylene copolymer, weight average molecular weight: 1,700,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 65% by volume: 35% by volume. Both sides of a polyethylene microporous film (thickness: 12 μm, porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Example 3

A coating liquid was prepared in the following manner: a polyvinylidene fluoride resin (vinylidene fluoride-hexafluoropropylene copolymer, weight average molecular weight: 1,000,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 53% by volume: 47% by volume. Both sides of a polyethylene microporous film (thickness: 12 μm, porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Example 4

A coating liquid was prepared in the following manner: a polyvinylidene fluoride resin (vinylidene fluoride-hexafluoropropylene copolymer, weight average molecular weight: 1,700,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 70% by volume: 30% by volume. Both sides of a polyethylene microporous film (thickness: 12 porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Example 5

A coating liquid was prepared in the following manner: a polyvinylidene fluoride resin (vinylidene fluoride-hexafluoropropylene copolymer, weight average molecular weight: 1,800,000, content of hexafluoropropylene: 2.5% by mass) was dissolved in a solvent (dimethylacetamide:tripropylene glycol=80:20 [mass ratio]) in such a manner that a content of the polyvinylidene fluoride resin was 4% by mass, and magnesium hydroxide (volume average particle diameter: 0.8 μm) was dispersed in such a manner that a ratio of magnesium hydroxide:polyvinylidene fluoride resin was 65% by volume: 35% by volume. Both sides of a polyethylene microporous film (thickness: 9 porosity: 43%, average pore diameter: 40 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Example 6

A coating liquid was prepared in the following manner: a polyvinylidene fluoride resin (vinylidene fluoride-hexafluoropropylene copolymer, weight average molecular weight: 1,800,000, content of hexafluoropropylene: 2.5% by mass) was dissolved in a solvent (dimethylacetamide:tripropylene glycol=80:20 [mass ratio]) in such a manner that a content of the polyvinylidene fluoride resin was 4% by mass, and magnesium hydroxide (volume average particle diameter: 0.8 μm) was dispersed in such a manner that a ratio of magnesium hydroxide:polyvinylidene fluoride resin was 65% by volume: 35% by volume. Both sides of a polyethylene microporous film (thickness: 9 μm, porosity: 40%, average pore diameter: 25 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Example 7

A coating liquid was prepared in the following manner: a polyvinylidene fluoride resin (vinylidene fluoride-hexafluoropropylene copolymer, weight average molecular weight: 1,700,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 65% by volume: 35% by volume. Both sides of a polyethylene microporous film (thickness:12 porosity: 55%, average pore diameter: 90 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Example 8

A coating liquid was prepared in the following manner: a polyvinylidene fluoride resin (vinylidene fluoride-hexafluoropropylene copolymer, weight average molecular weight: 1,100,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 53% by volume: 47% by volume. Both sides of a polyethylene microporous film (thickness:12 porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 1

A coating liquid was prepared in the following manner: a polyvinylidene fluoride resin (vinylidene fluoride-hexafluoropropylene copolymer, weight average molecular weight: 500,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 53% by volume:47% by volume. Both sides of a polyethylene microporous film (thickness:12 porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 2

A coating liquid was prepared in the following manner: a polyvinylidene fluoride resin (vinylidene fluoride-hexafluoropropylene copolymer, weight average molecular weight: 1,500,000, content of hexafluoropropylene: 5.2% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 40% by volume:60% by volume. Both sides of a polyethylene microporous film (thickness:12 porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 3

A coating liquid was prepared in the following manner: a polyvinylidene fluoride resin (vinylidene fluoride-hexafluoropropylene copolymer, weight average molecular weight: 1,700,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 80% by volume: 20% by volume. Both sides of a polyethylene microporous film (thickness:12 porosity: 49%, average pore diameter: 65 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 4

A coating liquid was prepared in the following manner: a polyvinylidene fluoride resin (vinylidene fluoride-hexafluoropropylene copolymer, weight average molecular weight: 1,000,000, content of hexafluoropropylene: 3.8% by mass) was dissolved in a solvent (dimethylacetamide:tripropylene glycol=65:35 [mass ratio]) in such a manner that a content of the polyvinylidene fluoride resin was 5% by mass, and magnesium hydroxide (volume average particle diameter: 0.8 μm) was dispersed in such a manner that a ratio of magnesium hydroxide:polyvinylidene fluoride resin was 53% by volume: 47% by volume. Both sides of a polyethylene microporous film (thickness: 12 porosity: 49%, average pore diameter: 65 nm) as a substrate were coated with the coating liquid, and the polyethylene microporous film was immersed in a coagulation liquid (dimethylacetamide:tripropylene glycol:water=30:16:54 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 5

A coating liquid was prepared in the following manner: a polyvinylidene fluoride resin (vinylidene fluoride-hexafluoropropylene copolymer, weight average molecular weight: 1,300,000, content of hexafluoropropylene: 11.4% by mass) was dissolved in a solvent (dimethylacetamide:tripropylene glycol=80:20 [mass ratio]) in such a manner that a content of the polyvinylidene fluoride resin was 5% by mass, and magnesium hydroxide (volume average particle diameter: 0.8 μm) was dispersed in such a manner that a ratio of magnesium hydroxide:polyvinylidene fluoride resin was 53% by volume: 47% by volume. Both sides of a polyethylene microporous film (thickness:12 porosity: 49%, average pore diameter: 65 nm) as a substrate were coated with the coating liquid, and the polyethylene microporous film was immersed in a coagulation liquid (dimethylacetamide:tripropylene glycol:water=30:16:54 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 6

A coating liquid was prepared in the following manner: a polyvinylidene fluoride resin (vinylidene fluoride-hexafluoropropylene copolymer, weight average molecular weight: 1,800,000, content of hexafluoropropylene: 2.5% by mass) was dissolved in a solvent (dimethylacetamide:tripropylene glycol=70:30 [mass ratio]) in such a manner that a content of the polyvinylidene fluoride resin was 5% by mass, and magnesium hydroxide (volume average particle diameter: 0.8 μm) was dispersed in such a manner that a ratio of magnesium hydroxide:polyvinylidene fluoride resin was 43% by volume:57% by volume. Both sides of a polyethylene microporous film (thickness:9 porosity: 43%, average pore diameter: 40 nm) as a substrate were coated with the coating liquid, and the polyethylene microporous film was immersed in a coagulation liquid (dimethylacetamide:tripropylene glycol:water=30:13:57 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 7

A coating liquid was prepared in the following manner: a polyvinylidene fluoride resin (vinylidene fluoride-hexafluoropropylene copolymer, weight average molecular weight: 1,950,000, content of hexafluoropropylene: 2.5% by mass) was dissolved in a solvent (dimethylacetamide:tripropylene glycol=70:30 [mass ratio]) in such a manner that a content of the polyvinylidene fluoride resin was 5% by mass, and an inorganic filler which is a mixture of one magnesium hydroxide (volume average particle diameter: 1.6 μm) and another magnesium hydroxide (volume average particle diameter: 1.2 μm) at a mixing ratio of 1:1 in terms of mass, was dispersed in such a manner that a ratio of the inorganic filler:polyvinylidene fluoride resin was 8% by volume:92% by volume. Both sides of a polyethylene microporous film (thickness:9 μm, porosity: 43%, average pore diameter: 40 nm) as a substrate were coated with the coating liquid, and the polyethylene microporous film was immersed in a coagulation liquid (dimethylacetamide:tripropylene glycol:water=30:13:57 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 8

A coating liquid was prepared in the following manner: a polyvinylidene fluoride resin A (vinylidene fluoride-hexafluoropropylene copolymer, weight average molecular weight: 1,950,000, content of hexafluoropropylene: 3.0% by mass) and a polyvinylidene fluoride resin B (vinylidene fluoride-hexafluoropropylene copolymer, weight average molecular weight: 470,000, content of hexafluoropropylene: 11.0% by mass) were mixed in such a manner that a ratio of resin A:resin B was 70% by mass: 30% by mass, the resultant mixture was dissolved in a solvent (dimethylacetamide:tripropylene glycol=70:30 [mass ratio]) in such a manner that a content of the mixture was 5% by mass, and crosslinked polymethyl methacrylate (PMMA) (volume average particle diameter: 1.8 μm) was dispersed in such a manner that a ratio of crosslinked polymethyl methacrylate:polyvinylidene fluoride resin was 60% by volume: 40% by volume. Both sides of a polyethylene microporous film (thickness: 9 μm, porosity: 43%, average pore diameter: 40 nm) as a substrate were coated with the coating liquid, and the polyethylene microporous film was immersed in a coagulation liquid (dimethylacetamide:tripropylene glycol:water=30:13 57 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 9

A coating liquid was prepared in the following manner: a polyvinylidene fluoride resin (vinylidene fluoride-hexafluoropropylene copolymer, weight average molecular weight: 1,800,000, content of hexafluoropropylene: 2.5% by mass) was dissolved in a solvent (dimethylacetamide:tripropylene glycol=80:20 [mass ratio]) in such a manner that a content of the polyvinylidene fluoride resin was 4% by mass, and magnesium hydroxide (volume average particle diameter: 0.8 μm) was dispersed in such a manner that a ratio of magnesium hydroxide:polyvinylidene fluoride resin was 65% by volume: 35% by volume. Both sides of a polyethylene microporous film (thickness: 9 porosity: 30%, average pore diameter: 15 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 10

A coating liquid was prepared in the following manner: a polyvinylidene fluoride resin (vinylidene fluoride-hexafluoropropylene copolymer, weight average molecular weight: 1,700,000, content of hexafluoropropylene: 3.8% by mass) was dissolved in a solvent (dimethylacetamide:tripropylene glycol=80:20 [mass ratio]) in such a manner that a content of the polyvinylidene fluoride resin was 6% by mass, and magnesium hydroxide (volume average particle diameter: 0.8 μm) was dispersed in such a manner that a ratio of magnesium hydroxide:polyvinylidene fluoride resin was 65% by volume: 35% by volume. Both sides of a polyethylene microporous film (thickness: 12 porosity: 58%, average pore diameter: 120 nm) as a substrate were coated with the coating liquid, and the polyethylene microporous film was immersed in a coagulation liquid (dimethylacetamide:tripropylene glycol:water=30:8:62 [mass ratio], temperature: 40° C.) to solidify the coating liquid. The coated film was rinsed with water and dried to obtain a separator with a porous layer formed on both sides of a polyethylene microporous film. Properties of the separator and evaluation results are shown in Table 1.

Comparative Example 11

A coating liquid was prepared in the following manner: a polyvinylidene fluoride resin (vinylidene fluoride-hexafluoropropylene copolymer, weight average molecular weight: 1,000,000, content of hexafluoropropylene: 3.0% by mass) was dissolved in N-methyl-2-pyrrolidone in such a manner that a content of the polyvinylidene fluoride resin was 6% by mass, and alumina (volume average particle diameter: 0.45 μm) was dispersed in such a manner that a ratio of alumina:polyvinylidene fluoride resin was 47% by volume: 53% by volume. Both sides of a polyethylene microporous film (thickness: 12 porosity: 49%, average pore diameter: 65 nm) as a substrate were coated with the coating liquid, and the polyethylene microporous film was immersed in water (temperature: 40° C.) used as a coagulation liquid to solidify the coating liquid. The coated film was rinsed with water and dried to obtain a separator with a porous layer formed on both sides of a polyethylene microporous film. Properties of the separator and evaluation results are shown in Table 1.

TABLE 1

| | Porous substrate | | | Porous layer | | | | | Separator | |
| | | | | PVDF-based resin | | | Filler | | | |
| | Thickness [μm] | Porosity [%] | Average pore diameter [nm] | Weight average molecular weight | HFP content [% by mass] | Type | average particle diameter [μm] | Volume ratio [% by volume] | Thickness [μm] | Porosity [%] |
|---|---|---|---|---|---|---|---|---|---|---|
| Example 1 | 12 | 49 | 65 | 1,500,000 | 5.2 | Mg(OH)$_2$ | 0.8 | 53 | 17 | 50 |
| Example 2 | 12 | 49 | 65 | 1,700,000 | 3.8 | Mg(OH)$_2$ | 0.8 | 65 | 17 | 53 |
| Example 3 | 12 | 49 | 65 | 1,000,000 | 3.8 | Mg(OH)$_2$ | 0.8 | 53 | 17 | 52 |
| Example 8 | 12 | 49 | 65 | 1,100,000 | 3.8 | Mg(OH)$_2$ | 0.8 | 53 | 17 | 53 |
| Example 4 | 12 | 49 | 65 | 1,700,000 | 3.8 | Mg(OH)$_2$ | 0.8 | 70 | 17 | 54 |
| Comparative Example 1 | 12 | 49 | 65 | 500,000 | 3.8 | Mg(OH)$_2$ | 0.8 | 53 | 17 | 52 |
| Comparative Example 2 | 12 | 49 | 65 | 1,500,000 | 5.2 | Mg(OH)$_2$ | 0.8 | 40 | 17 | 53 |
| Comparative Example 3 | 12 | 49 | 65 | 1,700,000 | 3.8 | Mg(OH)$_2$ | 0.8 | 80 | 17 | 52 |
| Comparative Example 4 | 12 | 49 | 65 | 1,000,000 | 3.8 | Mg(OH)$_2$ | 0.8 | 53 | 17 | 55 |
| Comparative Example 5 | 12 | 49 | 65 | 1,300,000 | 11.4 | Mg(OH)$_2$ | 0.8 | 53 | 17 | 56 |
| Example 5 | 9 | 43 | 40 | 1,800,000 | 2.5 | Mg(OH)$_2$ | 0.8 | 65 | 12 | 56 |
| Comparative Example 6 | 9 | 43 | 40 | 1,800,000 | 2.5 | Mg(OH)$_2$ | 0.8 | 43 | 12 | 57 |
| Comparative Example 7 | 9 | 43 | 40 | 1,950,000 | 2.5 | Mg(OH)$_2$ | 1.2 | 8 | 11 | 51 |
| Comparative Example 8 | 9 | 43 | 40 | 1,500,000 | 5.4 | PMMA | 1.8 | 60 | 12 | 55 |
| Example 6 | 9 | 40 | 25 | 1,800,000 | 2.5 | Mg(OH)$_2$ | 0.8 | 65 | 12 | 53 |
| Comparative Example 9 | 9 | 30 | 15 | 1,800,000 | 2.5 | Mg(OH)$_2$ | 0.8 | 65 | 12 | 50 |
| Example 7 | 12 | 55 | 90 | 1,700,000 | 3.8 | Mg(OH)$_2$ | 0.8 | 65 | 17 | 60 |
| Comparative Example 10 | 12 | 58 | 120 | 1,700,000 | 3.8 | Mg(OH)$_2$ | 0.8 | 65 | 17 | 65 |
| Comparative Example 11 | 12 | 49 | 65 | 1,000,000 | 3.0 | Al$_2$O$_3$ | 0.45 | 47 | 15.1 | 53 |

TABLE 1-continued

| | | Separator | | Evaluation | | | | |
|---|---|---|---|---|---|---|---|---|
| | Gurley value [seconds/100 cc] | Peel strength between porous substrate and porous layer [N/12 mm] | Bonding strength to electrode [N/15 mm] | Thermal shrinkage ratio in MD direction [%] | Thermal shrinkage ratio in TD direction [%] | Heat resistance [index] | Slitting property |
| Example 1 | 190 | 1.0 | 0.17 | 11 | 11 | 100 | B |
| Example 2 | 160 | 0.9 | 0.17 | 10 | 12 | 93 | A |
| Example 3 | 170 | 1.2 | 0.15 | 11 | 10 | 107 | C |
| Example 8 | 150 | 1.5 | 0.30 | 12 | 9 | 113 | A |
| Example 4 | 160 | 0.9 | 0.15 | 9 | 11 | 86 | A |
| Comparative Example 1 | 170 | 1.1 | 0.01 | 21 | 17 | 186 | D |
| Comparative Example 2 | 170 | 1.3 | 0.20 | 20 | 18 | 171 | A |
| Comparative Example 3 | 140 | 0.4 | 0.01 | 10 | 10 | 93 | C |
| Comparative Example 4 | 140 | 0.08 | 0.02 | 11 | 9 | 100 | E |
| Comparative Example 5 | 160 | 0.10 | 0.04 | 23 | 20 | 168 | D |
| Example 5 | 150 | 0.7 | 0.16 | 10 | 11 | 101 | B |
| Comparative Example 6 | 150 | 0.09 | 0.03 | 15 | 16 | 120 | E |
| Comparative Example 7 | 190 | 0.13 | 0.05 | 28 | 30 | 190 | D |
| Comparative Example 8 | 170 | 0.07 | 0.02 | 11 | 13 | 102 | E |
| Example 6 | 180 | 0.5 | 0.10 | 10 | 12 | 105 | C |
| Comparative Example 9 | 210 | 0.05 | 0.02 | 9 | 11 | 95 | D |
| Example 7 | 130 | 0.3 | 0.10 | 12 | 12 | 98 | C |
| Comparative Example 10 | 120 | 0.07 | 0.04 | 25 | 23 | 192 | D |
| Comparative Example 11 | 230 | 0.05 | 0.06 | 13 | 14 | 130 | E |

The disclosure of Japanese Patent Application No. 2014-135221, filed on Jun. 30, 2014, is incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A separator for a non-aqueous secondary battery, comprising:
 a porous substrate having an average pore diameter of from 25 nm to 90 nm; and
 a porous layer provided on one or both sides of the porous substrate and comprising a polyvinylidene fluoride resin and a filler,
 the porous layer comprising a filler in an amount of from 53% by volume to 70% by volume with respect to a total solid content of the porous layer,
 a weight average molecular weight of the polyvinylidene fluoride resin in the porous layer being 1,000,000 or more, and
 a peel strength between the porous substrate and the porous layer being 0.3 N/12 mm or more.

2. The separator for a non-aqueous secondary battery according to claim 1, wherein the weight average molecular weight of the polyvinylidene fluoride resin in the porous layer is 1,100,000 or more.

3. The separator for a non-aqueous secondary battery according to claim 1, wherein a volume average particle diameter of the filler is from 0.1 μm to 2.0 μm.

4. The separator for a non-aqueous secondary battery according to claim 1, wherein the filler is an inorganic filler.

5. The separator for a non-aqueous secondary battery according to claim 1, wherein the polyvinylidene fluoride resin comprises a vinylidene fluoride-hexafluoropropylene copolymer.

6. The separator for a non-aqueous secondary battery according to claim 5, wherein, in the vinylidene fluoride-hexafluoropropylene copolymer, a proportion of constituent units derived from hexafluoropropylene is from 2.0% by mass to 7.0% by mass.

7. The separator for a non-aqueous secondary battery according to claim 1, wherein the porous substrate is a polyolefin microporous film.

8. The separator for a non-aqueous secondary battery according to claim 1, wherein the porous layer is provided on both sides of the porous substrate.

9. A non-aqueous secondary battery comprising:
 a positive electrode;
 a negative electrode; and
 the separator for a non-aqueous secondary battery according to claim 1, which is disposed between the positive electrode and the negative electrode,
 wherein, in the non-aqueous secondary battery, an electromotive force is obtained by lithium doping/de-doping.

10. A separator for a non-aqueous secondary battery, comprising:

a porous substrate having an average pore diameter of from 25 nm to 90 nm; and a porous layer provided on one or both sides of the porous substrate and comprising a polyvinylidene fluoride resin and a filler, the porous layer comprising a filler in an amount of from 53% by volume to 70% by volume with respect to a total solid content of the porous layer, a weight average molecular weight of the polyvinylidene fluoride resin in the porous layer being 1,000,000 or more, and a peel strength between the porous substrate and the porous layer being 0.3 N/12 mm or more, wherein the porous substrate has a thickness of 10 μm to 25 μm.

11. The separator for a non-aqueous secondary battery according to claim 10, wherein the porous substrate has a thickness of 11 μm to 25 μm.

12. The separator for a non-aqueous secondary battery according to claim 10, wherein the porous substrate has a thickness of 12 μm to 25 μm.

13. The separator for a non-aqueous secondary battery according to claim 10, wherein the weight average molecular weight of the polyvinylidene fluoride resin in the porous layer is 1,100,000 or more.

14. The separator for a non-aqueous secondary battery according to claim 10, wherein a volume average particle diameter of the filler is from 0.1 μm to 2.0 μm.

15. The separator for a non-aqueous secondary battery according to claim 10, wherein the filler is an inorganic filler.

16. The separator for a non-aqueous secondary battery according to claim 10, wherein the polyvinylidene fluoride resin comprises a vinylidene fluoride-hexafluoropropylene copolymer.

17. The separator for a non-aqueous secondary battery according to claim 16, wherein, in the vinylidene fluoride-hexafluoropropylene copolymer, a proportion of constituent units derived from hexafluoropropylene is from 2.0% by mass to 7.0% by mass.

18. The separator for a non-aqueous secondary battery according to claim 10, wherein the porous substrate is a polyolefin microporous film.

19. The separator for a non-aqueous secondary battery according to claim 10, wherein the porous layer is provided on both sides of the porous substrate.

20. A non-aqueous secondary battery comprising:

a positive electrode;

a negative electrode; and the separator for a non-aqueous secondary battery according to claim 10, which is disposed between the positive electrode and the negative electrode, wherein, in the non-aqueous secondary battery, an electromotive force is obtained by lithium doping/de-doping.

* * * * *